United States Patent
Gao et al.

(10) Patent No.: US 12,363,448 B2
(45) Date of Patent: *Jul. 15, 2025

(54) AMBIENT LIGHT DETECTION AND HYPERLAPSE VIDEO GENERATION

(71) Applicant: Meta Platforms Technologies, LLC, Menlo Park, CA (US)

(72) Inventors: Jinglun Gao, San Mateo, CA (US); Jun Hu, San Jose, CA (US); Shan Tong, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,293

(22) Filed: Mar. 20, 2024

(65) Prior Publication Data

US 2024/0223912 A1 Jul. 4, 2024

Related U.S. Application Data

(63) Continuation of application No. 17/737,676, filed on May 5, 2022, now Pat. No. 11,979,667.

(60) Provisional application No. 63/257,839, filed on Oct. 20, 2021.

(51) Int. Cl.
| | |
|---|---|
| *H04N 23/741* | (2023.01) |
| *G01J 1/42* | (2006.01) |
| *H04N 1/00* | (2006.01) |
| *H04N 23/51* | (2023.01) |
| *H04N 23/65* | (2023.01) |
| *H04N 23/74* | (2023.01) |

(52) U.S. Cl.
CPC .......... *H04N 23/741* (2023.01); *G01J 1/4204* (2013.01); *H04N 23/51* (2023.01); *H04N 23/651* (2023.01); *H04N 1/00896* (2013.01); *H04N 23/74* (2023.01)

(58) Field of Classification Search
CPC .... H04N 23/741; H04N 23/51; H04N 23/651; H04N 1/00896; H04N 23/74; H04N 23/667; H04N 23/71; G01J 1/4204
See application file for complete search history.

(56) References Cited

U.S. PATENT DOCUMENTS

| | | |
|---|---|---|
| 7,046,864 B1 | 5/2006 | Pine |
| 9,838,641 B1 | 12/2017 | Lim et al. |
| 9,973,727 B2 | 5/2018 | Joshi et al. |
| 10,193,627 B1 | 1/2019 | Herman et al. |
| 10,602,075 B2 | 3/2020 | Case |
| 2015/0293575 A1 | 10/2015 | Hampson et al. |
| 2017/0180589 A1 | 6/2017 | Guo et al. |
| 2017/0187954 A1 | 6/2017 | Fukuya et al. |
| 2018/0167545 A1* | 6/2018 | Kosaka .................. G06V 40/16 |

(Continued)

OTHER PUBLICATIONS

Muchmore M., "Hyperlapse from Instagram (for iPhone) Review," PCMag, Aug. 27, 2014, Retrieved from the Internet: URL: https://www.pcmag.com/reviews/hyperlapse-from-instagram-for-iphone.

*Primary Examiner* — Quan Pham
(74) *Attorney, Agent, or Firm* — Freestone Intellectual Property Law PLLC; Aaron J. Visbeek (57) ABSTRACT

Hyperlapse imaging is described. A device may include a camera, a sensor and a data store. The camera is configured to capture images. The sensor detects ambient light properties. Captured images and the ambient light properties are processed in bulk to generate a hyperlapse video.

20 Claims, 6 Drawing Sheets

(56) References Cited

U.S. PATENT DOCUMENTS

| | | |
|---|---|---|
| 2019/0014242 A1 | 1/2019 | Piekarski et al. |
| 2019/0261370 A1 | 8/2019 | Amini et al. |
| 2020/0228696 A1 | 7/2020 | Liu |
| 2022/0375374 A1 | 11/2022 | Nicholson et al. |

* cited by examiner

AMBIENT LIGHT DETECTION AND HYPERLAPSE VIDEO GENERATION

CROSS-REFERENCE TO RELATED APPLICATIONS

This application is a continuation of U.S. application Ser. No. 17/737,676, filed May 5, 2022, which claims the benefit of U.S. Provisional Application No. 63/257,839, filed Oct. 20, 2021. U.S. application Ser. No. 17/737,676 and U.S. Provisional Application No. 63/257,839 are expressly incorporated herein by reference in their entirety.

TECHNICAL FIELD

This disclosure relates generally to imaging, and more specifically to hyperlapse imaging using wearable devices.

BACKGROUND INFORMATION

Certain types of devices (e.g., headsets) have limited power budgets, limited computing resources, or both. These constraints can make operations like intensive image processing infeasible to perform.

SUMMARY

Embodiments described herein provide methods, devices, programs, and systems for ultra-low power image capture. Embodiments described herein can reduce overall processing requirements by processing the captured images in bulk, thereby providing power savings. Furthermore, less information loss at the time of capture is incurred, thereby resulting in more advanced and more consistent post processing.

A device may include a camera, an ambient light sensor, and a data store. The device is configured to capture images. An ambient light sensor (ALS) is configured to detect associated ambient light properties for at least some of the captured images. The data store is configured to store the captured images and the associated ambient light properties. After a threshold amount, the stored captured images and the associated ambient light properties are processed in bulk to generate a hyperlapse video.

A method may comprise capturing images using a camera of a device and detecting ambient light properties associated with at least some of the captured images with an ambient light sensor (ALS). The captured images and the associated ambient light properties are stored on a data store within the device. After a threshold amount, the stored captured images and the associated ambient light properties are processed in bulk to generate a hyperlapse video.

A method may comprise suspending image processing operations by an image processing device while in a low-power mode and capturing a sequence of images. Ambient light properties associated with at least some of the images are detected using an ambient light sensor. Bulk image processing operations are then performed by the image processing device using the sequence of captured images and the associated light properties.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Existing consumer-grade image capture devices, including smart phones and wearable devices, can more easily provide advanced capture modes, such as hyperlapse, than was previously capable; however, these devices are constrained by power and computing resources, thereby making it difficult to sustain the advanced capture modes for a long duration before greatly draining battery power. Embodiments described herein provide methods, devices, programs, and systems for ultra-low power image capture that not only save power, but also, enable more advanced image processing to improve user experience, particularly for hyperlapse photography/videos.

Wearable devices (e.g., headsets that include a camera) have natural advantages that make it easier to capture images. For example, cameras that are mounted on glasses can capture long time-sequences of content with little effort on the part of the user. However, wearable devices are typically constrained by power and computing resources, thus making it more difficult to sustain long periods of image processing without draining battery. Similarly, other devices, including smart phones and other hand-held capture devices, may operate in a low-power mode to conserve battery, such as for preserving battery power that has been drained to a low-level or for preserving battery power between long durations between recharging, which may result in similar constraints in power and computing resources. Compared to video capture systems requiring real-time processing and encoding of captured images, the hyperlapse imaging system described herein can reduce overall processing requirements by processing captured images in bulk, thereby preserving processing power and providing power savings for a wearable device during hyperlapse capture. Furthermore, less information loss at the time of capture is incurred, thereby resulting in more advanced and more consistent postprocessing.

Hyperlapse is a form of time-lapse photography where the camera may change location, orientation, etc., between shots. A "time-lapse" may refer to an image capture technique in which a sequence of frames is captured or recorded in long intervals between each captured frame (e.g., at fixed time intervals), so as to portray a scene or action as faster-than-normal when playing back the captured frames in the sequence. For example, a time-lapse of a scene captured over the span of an entire day may portray the captured scene as an hour-long video. As another example, a time-lapse capturing 30 minutes of activity may portray the captured activity as a 2-minute video. Time-lapses may have different capture intervals that may be well-suited for different types of scenes and activities. For example, captures of a fixed location may have suitable capture intervals that may be longer than 1 frame per 5 seconds, while captures for sports, outdoor activities, and busy scenes may have suitable capture intervals in the range of 1 frame per second to 1 frame per 5 seconds. Hyperlapse incorporates movement during capture. As such, hyperlapse may be well-suited for dynamic capture environments, such as capturing activities that involve changes in capture location, viewpoint, and other spatial movements or jitters by the image capture device (e.g., shaking of the camera). For example, hyperlapse may be used to capture first-person views during exploration-type activities, such as driving, riding, biking, running, hiking, by way of example. A "hyperlapse video" may refer to a video file or moving image files portraying a captured hyperlapse. A video file may be created using the captured images, where there is a temporal spacing between adjacent frames (e.g., 1 min, 2 min, etc.,) as well as spatial offset between different frames as the camera moves through the world. Embodiments described herein enable ultra-low power image capture when operating in a hyperlapse image capture mode or in a low-power mode.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

A "headset" may refer to a device that is worn on or over a user's head, or portions thereof. For example, a headset may be a wearable device that, when worn over the user's eyes, may provide display capability near the user's field of vision, audio capability near the user's ears, or combinations thereof. A headset may also provide "hands-free" capability for a variety of tasks. For example, a headset may be configured to capture images in the direction that a user's head is facing, rather than a direction that a user may be holding and pointing a device in the user's hands. A "wearable device" may refer to a device that may be worn on, over, or fitted to, the user's body, such as during use. For example, a wearable device may include electronic devices configured in the form of headsets, including eye-pieces (e.g., glasses, goggles, contact lenses, etc.), ear-pieces (e.g., headphones, earphones, earbuds, etc.), or combinations thereof. Other wearable devices may include electronic devices (e.g., having processors, data stores, sensors, and/or communication systems) configured as clothing, watches, wristbands, and other apparel, to name a few non-limiting examples.

Figure 1:
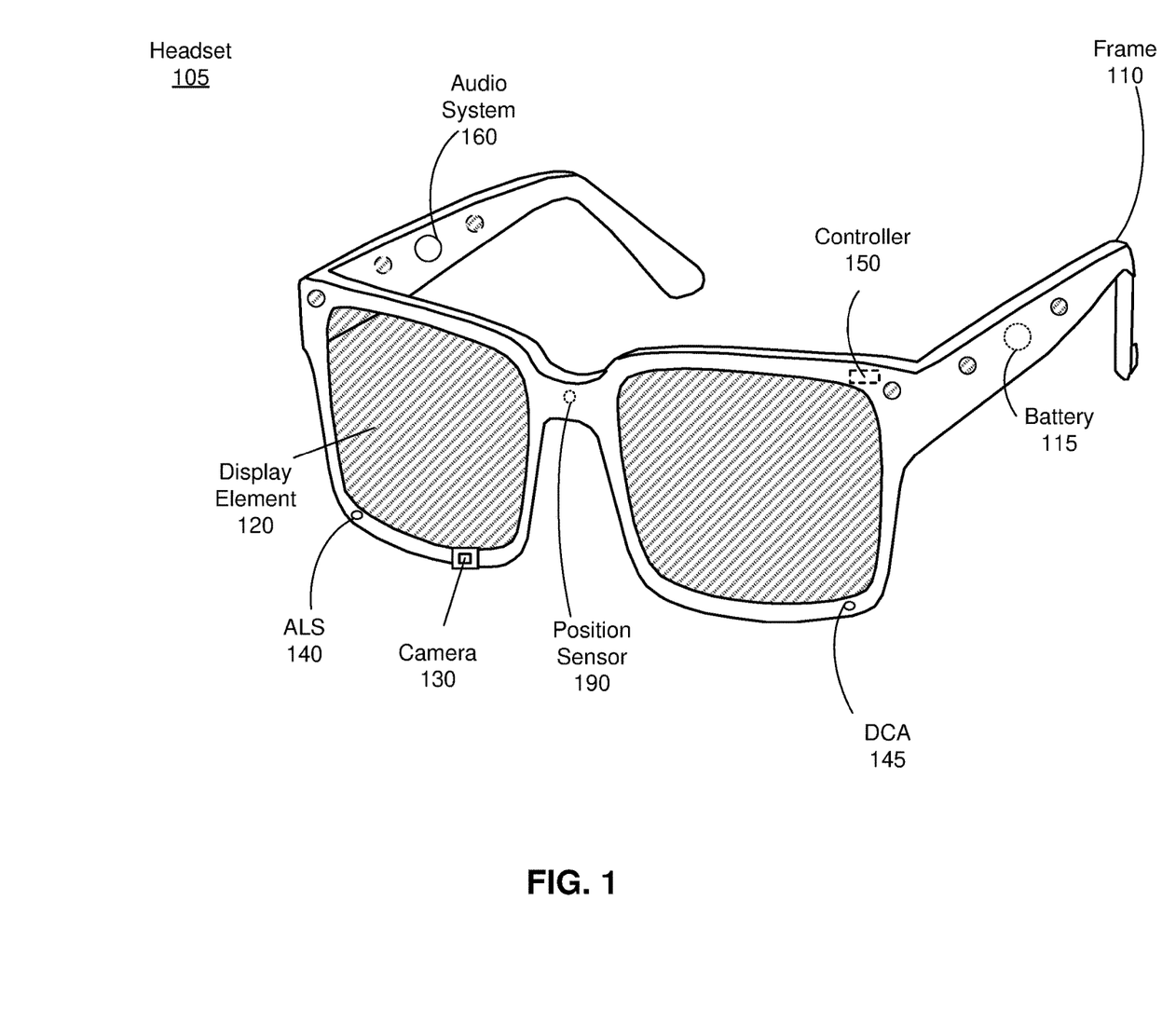
FIG. 1 is a perspective view of a headset, in accordance with one or more embodiments.

FIG. 1 illustrates an implementation of headset 105 in which the headset 105 is implemented as an eyewear device. In some embodiments, the eyewear device is a near eye display (NED). In general, the headset 105 may be worn on the face of a user such that content (e.g., media content) is presented using a display assembly and/or an audio system. However, the headset 105 may also be used such that media content is presented to a user in a different manner. Examples of media content presented by the headset 105 include one or more images, video, audio, or some combination thereof. The headset 105 includes a frame 110, and may include, among other components, a battery 115, a display assembly including one or more display elements 120, a camera 130, an ambient light sensor (ALS) 140, a depth camera assembly (DCA) 145, a controller 150, an audio system 160, and a position sensor 190. While FIG. 1 illustrates the components of the headset 105 in example locations on the headset 105, the components may be located elsewhere on the headset 105, on a peripheral device paired with the headset 105, or some combination thereof. Similarly, there may be more or fewer components on the headset 105 than what is shown in FIG. 1.

The frame 110 holds the other components of the headset 105. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The audio system 160 generates and outputs sound to the wearer of the headset 105. The audio system 160 may comprise one or more speakers and an audio controller. In some embodiments, the audio system may comprise an audio input device, such as a microphone.

The one or more display elements 120 provide light to a user wearing the headset 105. As illustrated the headset includes a display element 120 for each eye of a user. In some embodiments, a display element 120 generates image light that is provided to an eyebox of the headset 105. The eyebox is a location in space that an eye of user occupies while wearing the headset 105. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 105. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both display elements 120 are opaque and do not transmit light from a local area around the headset 105. The local area is the area surrounding the headset 105. In some embodiments, one or both display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 105. The DCA includes one or more depth cameras and a DCA controller (not shown in FIG. 1). The DCA may include an eye tracking unit that determines eye tracking information. The eye tracking information may comprise information about a position and an orientation of one or both eyes (within their respective eye-boxes). The eye tracking unit may include one or more eye-facing cameras. The eye tracking unit estimates an angular orientation of one or both eyes based on images captures of one or both eyes by the one or more eye-facing cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 105 may prompt the user to opt-in to allow operation of the eye tracking unit. For example, by opting-in the headset 105 may detect, store, images of the user's any or eye tracking information of the user.

Camera 130 captures images. Camera 130 is configured to capture images in an outward direction that a user/wearer of headset 105 is facing. In embodiments, the images may comprise raw images. "Raw images" may refer to unprocessed or minimally processed image data generated from an image sensor, such as raw data taken from an image sensor of camera 130. For example, a raw image file may be any file from a digital camera, film scanner, or image scanner, and that has not yet been processed into an editable format, such as an editable format that is processable by a graphics editor (e.g., raster graphics editor or bitmap graphics editor). Processing into an editable format may often require processing by an encoder or raw converter in a wide-gamut internal color space to form a positive file format that has in some way been compressed (e.g., into a raster image file or vector image file), such as JPEG, BMP, GIF, PNG, TIFF, EPS, PDF, etc. Some non-limiting examples of raw image file formats include: .raw, .cr2, .nef, .orf, .sr2, to name a few.

Ambient light sensor (ALS 140) determines ambient light properties of the area being imaged by camera 130. Ambient light properties include values of brightness in one or more channels. At least some of the channels may be of different frequency bands of light. For example, ALS 140 may include individual pixels for detecting red light, green light, blue light, infrared light, ultraviolet light, and wide band (e.g., no filter or clear). The ambient light properties may be used for metering, determining scene color response (e.g., for white balance), etc.

The controller 150 instructs hardware components to perform functions. The controller 150 controls, and provide instructions to, the other hardware components of headset 105 (e.g., of display element 120, camera 130, ALS 140, DCA 145, audio system 160, and position sensor 190). This may include functions for facilitating the sending and receiving of data between the hardware components. The controller 150 may further be configured to monitor states of the hardware components, including power, memory usage and storage, response/processing times, and other feedback. In embodiments, the controller 150 may be configured to monitor captured images stored in a data store of headset 150, and responsive to the number of captured images or total size of captured images stored in the data store, instruct a communication system of headset 150 to transfer the stored captured images and associated ambient light properties to an image processing device. In embodiments, controller 150 may also be configured to instruct ALS 140 to concurrently detect associated ambient light properties for each captured image as they are being captured. In some embodiments, the controller 150 may further be configured to instruct the data store to delete the stored captured images and associated ambient light properties. For example, the controller 150 may be configured to delete the captured image immediately after, or soon after, transferring to an image processing device. Further details pertaining to a suitable controller 150 is explained with respect to the description of controller 250 of FIG. 2.

The position sensor 190 generates one or more measurement signals in response to motion of the headset 105. The position sensor 190 may be located on a portion of the frame 110 of the headset 105. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof. In some embodiments, the one or more gyroscopes may obtain/generate gyroscope data, which may be used in a bulk image processing operation for generating a hyperlapse video. For example, one or more of a rotation, orientation, and/or position of one or more image frames in a captured sequence can be adjusted so that the camera view appears stable throughout the hyperlapse (e.g., by performing rotations and translations on specific frames based on gyroscope measurements associated with each frame and of other frames). In some embodiments, the headset 105 may provide for simultaneous localization and mapping (SLAM) for a position of the headset 105 and updating of a model of the local area. For example, the headset 105 may include a passive camera assembly (PCA) that generates color image data. The PCA may include one or more RGB cameras that capture images of some or all of the local area. In some embodiments, the PCA may include, or may be the same component as, camera 130. In some embodiments, some or all of the cameras of the depth camera assembly (DCA) 145 may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 105 within the local area.

Battery 115 provides power to hardware components of headset 105. This may include providing power for image capture by camera 130, providing power for performance of tasks by controller 150, providing power for other functions of headset 105, or some combination thereof. Embodiments described herein enable ultra-low power image capture by headset 105, which may be performed by controller 150 when the headset 105 is operating in a hyperlapse image capture mode or in a low-power mode. When streaming complementary metal oxide semiconductor (CMOS) camera sensor data (typically 12 M pixels at 30 FPS), the SoC uses dedicated hardware such as ISP as well as CPU to process the data (e.g., total power consumption is >100 mW). However, if using an ambient light sensor for scene perception, its data stream as well as computing may only involve low power computing units such as Micro-controller unit (MCU), which is considered as ultra-low power mode. Accordingly, "ultra-low power" may refer to a mode of operation for an electronic device in which only low power computing units are used. And a "low-power mode" may refer to a mode of operation that consumes more power than the ultra-low power mode, but also is a mode in which various computing functions and operations are limited or reduced in capacity in order to preserve remaining battery power. For example, a device may be automatically switched to a low-power mode when remaining battery power is below a threshold level (e.g., less than 20% of total capacity) or may be switched to the low-power mode by a user to preserve the remaining battery power over an extended period of time or for long durations between recharging (e.g., when the user is currently in a location without power or does not currently have access to battery charging means). Additional details regarding the components of the headset 105 with respect to various embodiments are discussed below in connection with FIG. 2 and FIG. 6.

Figure 2:
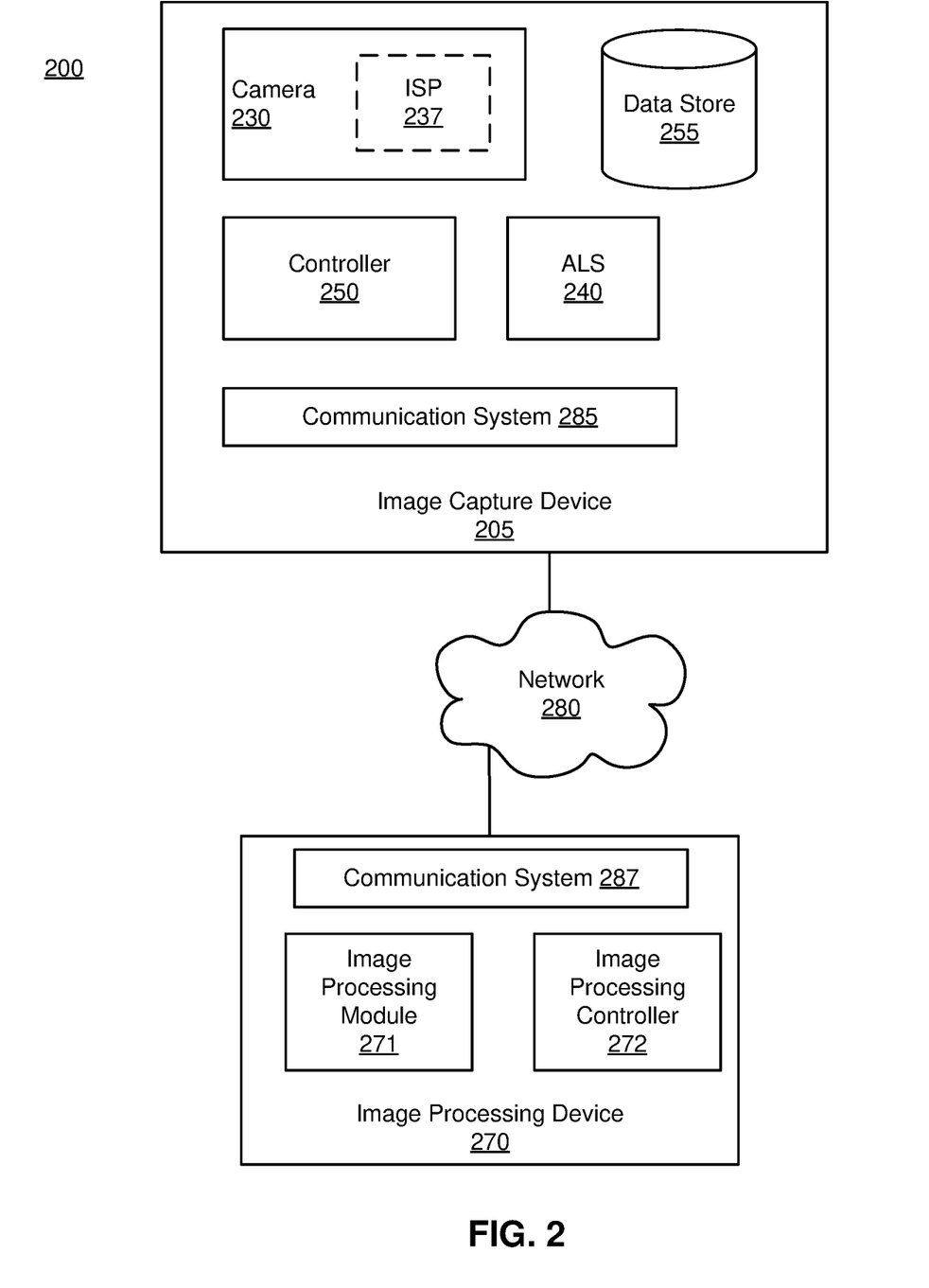
FIG. 2 is a block diagram of a system for ultra-low power image capture and hyperlapse video generation, in accordance with one or more embodiments.

FIG. 2 is a block diagram of an imaging system, in accordance with one or more embodiments. Imaging system 200 is a system for ultra-low power image capture and hyperlapse video generation. Imaging system 200 includes an image capture device 205 for capturing and storing images and an image processing device 270 for processing images. Network 280 delivers data messages between image capture device 205 and image processing device 270. Network 280 may be a communication network, such as the global internet, Wi-Fi, personal area network(s), local area network(s), Bluetooth, near-field communication, to name a few non-limiting illustrative examples. Further details regarding suitable network(s) 280 are discussed in connection with the description of network 680 of FIG. 6 further below.

The image capture device 205 of imaging system 200 captures and stores images. In embodiments, the images may comprise raw images captured when the image capture device 205 is operating in a hyperlapse capture mode or low-power mode. Image capture device 205 is configured to generate images from extracted information. For example, light from an environment may be measured using an image sensor of camera 230 and extracted or "captured" as an image file. Image capture devices can be mechanical, analog electronic, digital, or have combinations of mechanical, analog electronic, and digital aspects. As one example, an image capture device may include an RGB camera, though an image capture device can generally be any device that captures and generates images and may not be limited to only capturing images formed from visible light. For example, image capture devices may include electronic devices that form images from radio waves, microwaves, infrared, visible light, ultraviolet (UV), other electromagnetic waves, or some combination thereof. In one embodiment, image capture device 205 may be headset 105 of FIG. 1. Image capture device 205 includes a camera 230, a data store 255, an ambient light sensor (ALS) 240, a controller 250, and a communication system 285. In various embodiments, the image capture device 205 may be a wearable device (e.g., headset, wristwatch, wearable button, etc.), a hand-held device (e.g., a smartphone, tablet, hand-held digital camera, etc.), some other device that can capture images, or some combination thereof.

The data store 255 stores data relevant for use by the imaging system 200. Data store 255 may be configured to persistently store data. For example, data store 255 may be a non-volatile memory device for file storage, such as hard disk drive (HDD), solid state drive (SSD), flash memory, read-only memory (ROM), by way of example. In one embodiment, the data store 255 may include volatile memory, such as RAM or DRAM. In embodiments, data stored in data store 255 may include, e.g., raw image files, ambient light properties associated with the stored raw image files, position sensor data associated with the stored raw image files (e.g., gyroscope data), image capturing instructions, data transfer instructions, other data relevant for use by the image capture device 205, or some combination thereof. In one embodiment, data store 255 may also include a virtual model of a local area.

Communication systems 285 and 287 communicate messages. In embodiments, communication systems 285 and 287 send, receive, and format messages delivered over network 280 by image capture device 205 and image processing device 270 respectively. The communication systems 285 and 287 may include network interfaces for communicating over internet protocol (IP), transmission control protocol (TCP), some other standard communication protocol, or some combination thereof. Communication systems 285 and 287 may comprise wireless connections, wired connections, some other connection type to network 280, or some combination thereof. Communication system 285 may be configured to transfer data from image capture device 205 to image processing device 270, and communication system 287 may be configured to receive transferred data from image capture device 205 by image processing device 270, and vice versa. In embodiments, data messages delivered over network 280 using communication systems 285 and 287 may contain image data. The image data may include captured images, ambient light properties, data relevant for associating the captured images and the ambient light properties, other data relevant for image processing, or some combination thereof. For example, the messages may include captured images, ambient light properties, and frame numbers and/or timestamps associated with each of the captured images and with each of the ambient light properties.

The controller 250 instructs hardware components to perform functions. Controller 250 controls and provides instructions to the components of image capture device 205. This may include instructions for facilitating the sending and receiving of image data over network 280 via communication system 285. The controller 250 may be configured to monitor states of the hardware components, including power, memory usage and storage, response/processing times, and other feedback. In embodiments, the controller 250 may be configured to monitor captured images stored in the data store 255. For example, the controller 250 may monitor the number of captured images that are stored in data store 255, the total file size of captured images stored in data store 255, some other quantity or amount pertaining to file storage of captured images, or some combination thereof. In one embodiment, the controller 250 may be configured to instruct communication system 285 to transfer captured images stored in data store 255, and data associated therewith, to image processing device 270 when a threshold amount has been exceeded. The threshold amount may be a threshold for the number of stored images, the total file size of stored images, some other threshold relating to image file storage, or some combination thereof. In other embodiments, the controller 250 may be configured to instruct communication system 285 to perform the transfer after a threshold amount of time or once initiated by the user. The transferred data may include raw image frames and ambient light properties associated with each frame. In one embodiment, the transferred data may also include gyroscope data associated with each frame, such as the orientation and angular velocity of the image capture device 205 measured from frame-to-frame.

Camera 230 captures images. Camera 230 may be configured to capture image data and generate an image file, such as a raw image file. The camera 230 comprises an imaging sensor (not shown) for capturing raw image data. For example, the image sensor may be configured to generate a raw image by receiving light through one or more lenses and detecting light hitting one or more pixels in a 2D array. The imaging sensor may be a charge coupled device, a complementary metal oxide semiconductor, by way of example. As described herein, a raw image file is an unprocessed, or minimally processed, image file that is generated using light detected by the imaging sensor.

In some embodiments, camera 230 may include, or be communicatively coupled to, an ISP 237. When activated, the ISP performs an image processing pipeline on each captured image. An image signal processor (ISP) may be a dedicated component of an image capture device (or of a device, computer, server computer, or system communicatively coupled to the image capture device) that takes raw data (e.g., a raw image file) from the camera 230 and converts it into a workable image. An "Image signal processing (ISP) pipeline" may refer to a set of image processing operations normally performed by an ISP on a captured image or during image capture, such as in a process of conversion of a captured image into digital form, and may include such operations as demosaicing, noise reduction, auto exposure, autofocus, auto white balance, color correction, color interpolation, lens shading correct, defect pixel correction, gamma correction, local tone mapping, autoexposure, autofocus, image sharpening, and other image quality enhancements that may be referred to herein as "image processing." In pre-existing image capture devices, an ISP may normally perform image processing in real-time during capture, while also providing real-time feedback to the controller of the image capture device and immediately encoding captured frames into an encoded image (e.g., JPEG) or into an encoded video using a video encoder. It is noted, that although ISP 237 is shown in FIG. 2 as being integrated in camera 230, in some embodiments, the ISP 237 may not be integrated into camera 230 and may be a separate component of image capture device 205. In one embodiment, the image capture device 205 may not include an ISP 237. In one embodiment, controller 250 may perform all or some of the same functions as the ISP 237. In embodiments, the image signal processing (ISP) pipeline may be suspended during low-power capture. For example, when image capture device 205 is in low-power mode or in a hyperlapse capture mode, image capture device 205 may be configured to bypass the ISP pipeline during capture (e.g., refrain from activating the ISP 237). The raw images can later be image processed using the image processing controller 272 of image processing device 270. Image processing that is performed on a captured image after it has been output by an image capture device may be referred to as "post-processing." In embodiments, post-processing may comprise making a bundle adjustment to image characteristics (e.g., brightness, tone, orientation, rotation, position, etc.) to a set of image frames within a sequence based on an evaluation of characteristics of the entire sequence or characteristics spanning multiple frames. The bundle adjustment may be referred to as "bulk image processing."

ALS 240 detects ambient light properties. ALS 240 may be a photodetector, or photosensor, that is used to sense the amount of ambient light present in an environment. For example, an ALS may be configured to measure or determine ambient light properties of an area being imaged by camera 230. Ambient light properties may comprise values of brightness in one or more channels for an area being imaged. For example, ALS 140 may include a set of pixels, where each pixel is configured to sense a particular frequency band in the light spectrum, such as for detecting red light, green light, blue light, infrared light, ultraviolet light, or wide band (e.g., clear or no filter), and values for brightness or intensity in each of these channels may be configured as the ambient light properties. Ambient light properties may be used for metering, determining scene color response (e.g., for white balance), etc. In embodiments, measurements by the ALS 240 may inform or drive operations of the controller 250, such as by providing feedback for adjustment of exposure, color response, and other camera settings. As used herein, an exposure value (EV) may refer to a quantitative measure of the amount of light reaching an image sensor for a particular gain value (E.g., ISO 100). For a given gain value, an EV may be determined by such characteristics as shutter speed (e.g., exposure time), lens aperture, and scene luminance. For example, an EV may be a number that represents a combination of camera 230's shutter speed, f-number at a particular gain. Generally, a higher EV may result in higher exposure. An EV may determine how much information for dark and bright pixels are contained in captured images. Underexposed images may be missing information for darker pixels, while overexposed images may be missing information for brighter pixels. A perfectly exposed image may contain all the pixel information varying from dark shadows to the whites and highlights of an image. A correctly exposed image is one in which a satisfactory amount of dark pixel and bright pixel information is contained. The ALS 240 is configured to detect ambient light properties that are associated (i.e., have temporal correspondence) with at least some of the generated raw image files. And in some embodiments, the ALS 240 is configured to detect associated ambient light properties for each generated raw image file concurrently with the capture of each image. The associated ambient light properties obtained via the ALS are stored in the data store 255. Note that the ALS 240 has a much lower resolution than the camera, and as such, the associated ambient light properties associated with a given raw image file take much less room to store than the raw image file.

In embodiments, the camera 230 may be configured to capture a series or sequence of raw images in accordance with image capturing instructions performed by the controller 250. Image capturing instructions may be automatically performed by the controller 250, initiated by a user, or may include various combinations of automatic and user-initiated instructions. The image capturing instructions may provide a time interval between images, bracketing instructions. For example, for each image frame at predicted exposure (EV 0), the camera 230 may be instructed to capture a corresponding underexposed image (e.g., EV −1) and a corresponding overexposed image (e.g., EV+1). The image capturing instructions may also include commands to start imaging, commands to stop imaging, a total length of time for imaging, a gain value, other image capturing instructions, or some combination thereof. The camera 230 may use ambient light properties from the ALS 240 to adjust exposure for imaging an area. Concurrent with the capture of the images, the controller 250 may be configured to instruct the camera 230 to adjust one or more of an exposure setting (e.g., exposure time, aperture, gain, or some combination thereof) and a color setting (e.g., to set white balance) based on the associated ambient light properties detected by the ALS 240. For example, when a change in lighting, brightness, color, or tone characteristics is detected by the ALS 240, the controller 250 may be configured to instruct camera 230 to adjust an aperture or other exposure configuration, to adjust a color response, to adjust some other capture setting of the camera 230, or some combination thereof. The camera 230 generates the raw image files in accordance with the image capturing instructions and stores them in the data store 255. Once a trigger occurs (e.g., user prompt, threshold amount of data stored, etc.), the controller 250 provides the stored raw image files and associated ambient light properties to the image processing device 270. It is noted that the user may opt-in to allow the controller 250 to transmit data captured by the image capture device 205 to systems external to the image capture device 205, and the user may select privacy settings controlling access to any such data. In one embodiment, data store 255 may be instructed to remove the stored raw image files and associated ambient light properties (e.g., delete after transferring to image processing device 270).

Image processing device 270 processes images. In embodiments, the image processing device 270 may be a smartphone, computer, server computer, or other processing device. The image processing device 270 may be any device that is not limited by the same power and/or computing restraints of the image capture device 205. For example, the image processing device 270 may be a computer, a server, a tablet, smart phone, some other device with greater power and/or computing resources than the image capture device 205, or some combination thereof. Image processing module 271 stores image processing instructions. The image processing instructions may include analyzing exposure levels for each of the stored captured images and adjusting exposure levels of at least one of the stored captured images based on the analyzed exposure levels. The image processing instructions may further include generating a plurality of image frames to generate a hyperlapse video using the plurality of image frames. For example, the stored captured images, including images for which exposure levels have been analyzed and adjusted, may be organized into image frames, and the frames may be compiled into a video sequence making up the hyperlapse video. In one embodiment, the image processing instructions may further include adjusting one or more of a rotation, orientation, or position of one or more of the image frames based on gyroscope data.

The image processing controller 272 executes processing instructions. In embodiments, the image processing controller is configured to generate a hyperlapse video. The image processing controller 272 uses data collected by the image capture device 205 to generate a hyperlapse video based on the image processing instructions of image processing module 271. The image processing device 270 may have a higher power budget than the image capture device 205. The image processing device 270 may also have a higher computing budget than the image capture device 205. In this manner, image processing of images captured by image capture device 205 is offloaded to image processing device 270 to offload power consumption and/or consumption of computing resources associated with generating a hyperlapse video. The image processing controller 272 of image processing device 270 is configured to process the raw image files and associated ambient light properties from ALS 240 to generate a hyperlapse video. The image processing controller 272 may use the ambient light properties to set color and exposure levels of each image frame. For bulk image processing, the image processing controller 272 may use previous and/or subsequent image frames and their associated ambient light properties to increase consistency in color and/or brightness in the hyperlapse video in an efficient manner. In some embodiments, the controller may perform high dynamic range (HDR) fusion of multiple raw image frames of a same scene to generate an HDR frame that has a larger dynamic range than that of a single raw image frame. Moreover, the image processing controller 272 may adjust the HDR frame in accordance with prior HDR frames, subsequent HDR frames, raw image files, other relevant image data, or some combination thereof. Once the raw image files have been processed for brightness, color, HDR, etc., to generate processed image frames, the processed image frames may be packaged as a hyperlapse video. Note in some embodiments, the processed image frames are compressed via one or more compression algorithms (e.g., JPEG) prior to being packaged as the hyperlapse video.

In one embodiment, the image capture device 205 and image processing device 270 may be implemented as the same device. In such an embodiment, the image processing device 270 may share some or all of the same functionality, features, and components of image capture device 205. In the embodiment, image capture device 205 may be a configuration of the image processing device 270 when image processing device 270 is operating in a low-power mode. For example, a smartphone or other hand-held device may have a low power mode of operation to conserve power. In the low power mode, device operations (e.g., image processing) that require higher power budgets and/or use a lot of computing resources are suspended. The image processing device 270 may be configured to suspend image processing operations while in a low-power mode and capture a sequence of raw images. The image processing device 270 may then detect, concurrent with capturing the raw image sequence, associated ambient light properties for at least some of the raw images via ambient light sensor (ALS) 240. For example, an ISP pipeline that is normally activated and performed by ISP 237 during image capture may be bypassed so that captured images may be stored in raw format and associated with measurements taken by ALS 240 during capture. And, when the low-power mode is disabled, the image capture device 205 may resume the suspended activities and perform bulk image processing of the stored raw images. In some of these embodiments, the image processing controller 272 may be ISP 237 on the image capture device 205 and may be configured to defer processing image data from camera 230 until no longer operating in a low-power mode. When the low-power mode is disabled, the image processing controller may perform the image processing operations using the raw image sequence and the associated light properties, per image processing instructions of image processing module 271. Completion of the image processing operations by the image processing device 270 may generate a hyperlapse video.

In one embodiment, the image processing device 270 is further configured to detect concurrently with the captured of the images, via a position sensor on the image processing device 270, associated gyroscopic data relating to at least some of the raw images. At a later point in time, such as when a low-power mode is disabled, the image processing device 270 may perform the image processing operations using the stored captured images and the gyroscopic data. For example, in order to compensate for shaking, jitters, and other instabilities during capture, the image processing device 270 may orient, rotate, or re-position one or more frames in the sequence to generate a hyperlapse video that has a stable viewpoint from frame-to-frame.

Note that in pre-existing hyperlapse cameras, captured images are processed independently in real time, and the independently processed images are later combined to form the hyperlapse video. Such an image processing pipeline may cause brightness, color and noise/sharpness control to be processed differently from frame to frame. Moreover, pre-existing hyperlapse processing compress images prior to generating the hyperlapse video. In contrast, embodiments herein enable more advanced consistent processing across some or all raw image files. For example, color and brightness of the hyperlapse can be optimized in a temporal consistency manner, which can improve the quality of the hyperlapse. Fusing of image frames taken at varying exposure values into a single HDR frame may be part of an HDR fusion. HDR fusion of an EV sweep can be integrated into the post-processing pipeline, such that the dynamic range of a scene can be better aligned with the whole sequence of image frames. Additionally, as raw image files generally have a larger bit depth than compressed files, processing the raw image files in bulk, rather than individually, and then compressing them afterwards, can result in a hyperlapse video with less loss (e.g., better color gamut).

In one illustrative example, a user will be moving around into different areas during a hyperlapse capture (e.g., user goes on a hike). The exposure between frames can be dramatically different as the scenery and time of day changes. As the time between frames may be on the order of tens of seconds or more, and the location and EV may be changing, the imaging system 200 is able to analyze all (or a large portion of) the image frames in order to generate a more optimal exposure for the entire video than conventional HDR systems.

Figure 3:
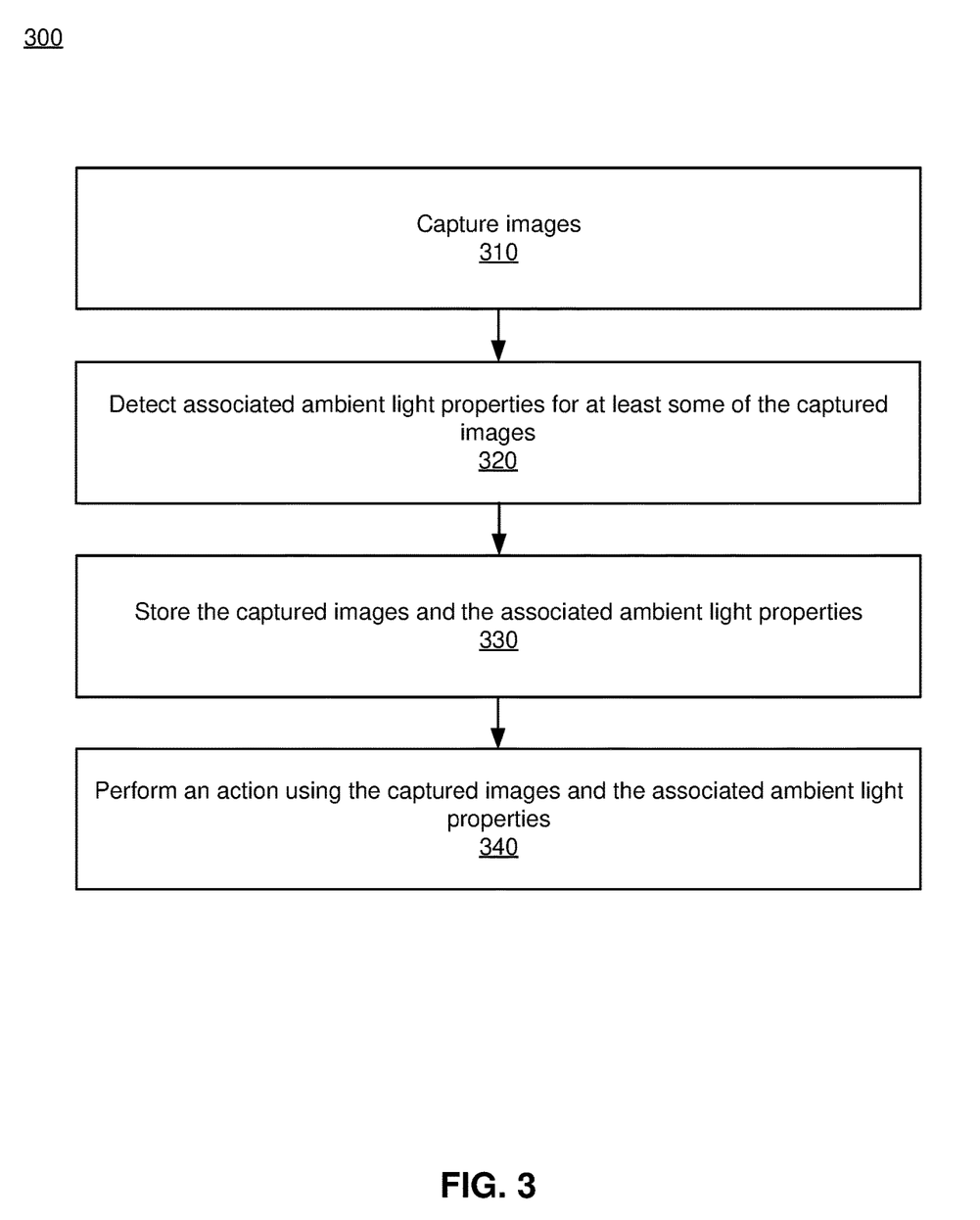
FIG. 3 is a flowchart illustrating a process for ultra-low power image capture for hyperlapse video generation in accordance with one or more embodiments.

FIG. 3 is a flowchart of a process 300 for ultra-low power image capture for hyperlapse video generation, in accordance with one or more embodiments. The process 300 shown in FIG. 3 may be performed by components of an imaging system (e.g., imaging system 200 of FIG. 2). Other entities may perform some or all of the steps of process 300 in other embodiments. Embodiments may include different or additional steps or may perform the same steps in different orders.

The imaging system captures 310 images. The imaging system may capture images using one or more cameras (e.g., camera 130/230). In embodiments, the images are captured in raw format without triggering an ISP. In one embodiment, the images may be captured using an exposure value (EV) sweep. An "EV sweep" may refer to capturing a set of image frames at varying EVs for each capture. Performing an EV sweep can be used to generate high-dynamic range (HDR) image frames, which have wider dynamic range than image frames processed at a single exposure value.

The imaging system detects 320 associated ambient light properties for at least some of the captured images. The ambient light properties may be detected using an ambient light sensor (e.g., ALS 140/240). In one embodiment, the ambient light properties may be detected over the span of a capture, and each detected light property may be associated with one or more image frames that are captured (e.g., based on temporal information). In one embodiment, ambient light properties associated with a particular captured image are detected concurrently with the capturing of the particular image.

The imaging system stores 330 the captured images and the associated ambient light properties. The captured images and the associated ambient light properties may be stored in a data store of an image capture device (e.g., data store 255 of FIG. 2). In one embodiment, gyroscope data can also be measured over the span of the capture and may be stored together with the captured images and the associated ambient light properties (e.g., as a time-stamped and/or frame-numbered sequence).

The imaging system performs 340 an action using the captured images and the associated ambient light properties. In embodiments, the action may include performing bulk image processing on the sequence of captured images and the associated ambient light properties to generate a hyperlapse video. Further details regarding the action performed in step 340 and additional actions that may be performed separately, or in conjunction with, step 340 are described with respect to process 400A and 400B of FIGS. 4A and 4B.

Figure 4A:
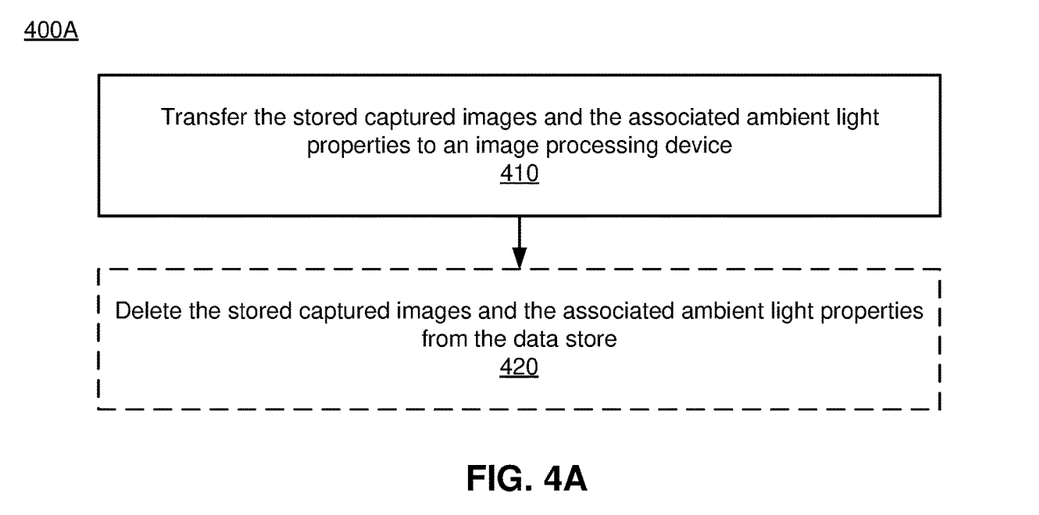
FIG. 4A is a flowchart illustrating a process for processing captured images for hyperlapse video generation, in accordance with one or more embodiments.

FIG. 4A is a flowchart illustrating a process for processing captured images for hyperlapse video generation, in accordance with one or more embodiments. The process 400A shown in FIG. 4A may be performed by components of an imaging system (e.g., imaging system 200 of FIG. 2). Other entities may perform some or all of the steps of process 400A in other embodiments. Embodiments may include different or additional steps or may perform the same steps in different orders.

The imaging system transfers 410 stored captured images and associated ambient light properties to an image processing device. For example, raw images captured using camera 130 of headset 105/205 and ambient light properties detected using ALS 140/240 may be transferred to a smartphone of a user (e.g., image processing device 270).

Optionally, the imaging system deletes 420 the stored captured images and the associated ambient light properties from a data store. In optional step 420, after the raw images and ambient light properties have been transferred to an image processing device (e.g., image processing device 270), they may be deleted from the original storage location on the capture device (e.g., deleted from data store 255 of FIG. 2). For example, a headset may be configured to remove a sequence of raw images after transferring them to the image processing device for post-processing.

Figure 4B:
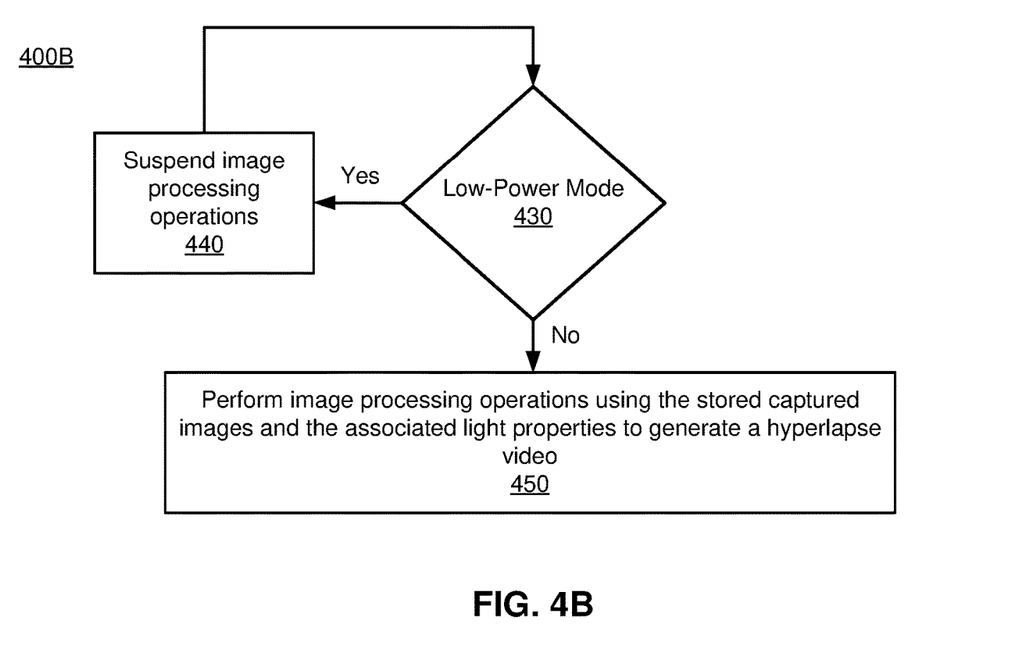
FIG. 4B is a flowchart illustrating a process for processing captured images for hyperlapse video generation, in accordance with one or more other embodiments.

FIG. 4B is a flowchart illustrating a process for processing captured images for hyperlapse video generation, in accordance with one or more other embodiments. The process 400B shown in FIG. 4B may be performed by components of an imaging system (e.g., imaging system 200 of FIG. 2). Other entities may perform some or all of the steps of process 400B in other embodiments. Embodiments may include different or additional steps or may perform the same steps in different orders.

The imaging system checks 430 for a low-power mode. In step 430, a controller of a device checks if the device is operating in a low-power mode. If the device is operating in a low-power mode at step 430, then the device performs step 440.

The image system suspends 440 image processing operations. For example, the device may bypass an ISP pipeline during image capture in the low-power mode and store captured images in raw format instead. If the device is not operating in a low-power mode at step 430 or if the low-power mode has been disabled, the imaging system moves to step 450.

The image system performs 450 image processing operations using stored captured images and associated light properties to generate a hyperlapse video. For example, bulk image processing may be performed across an entire sequence of raw images. Color and brightness of the hyperlapse can be optimized in a temporal consistency manner, which can improve the quality of the hyperlapse. HDR fusion of an EV sweep can be applied into the post-processing such that the dynamic range of the scene can be better aligned with the whole sequence.

Figure 5:
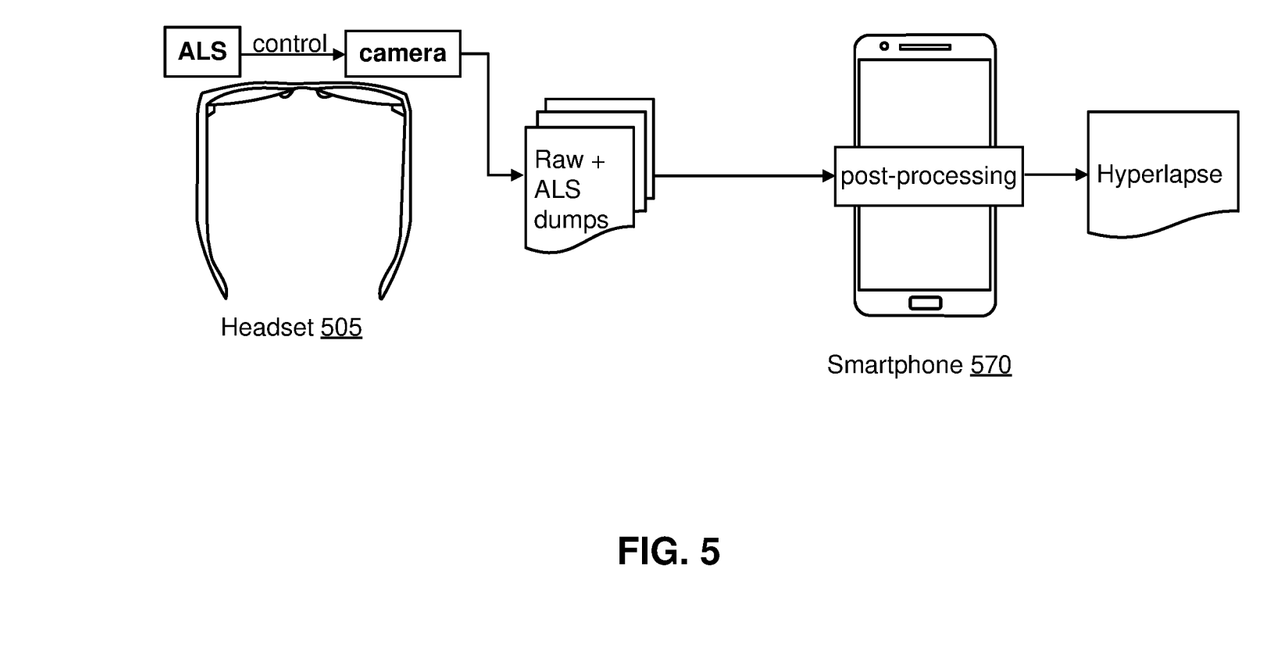
FIG. 5 is a conceptual diagram illustrating a process for ultra-low power image capture and hyperlapse video generation, in accordance with one or more embodiments.

FIG. 5 is a conceptual diagram illustrating a process for ultra-low power image capture and hyperlapse video generation, in accordance with one or more embodiments. As illustrated, a headset 505 uses an ALS to inform, and drive control of, a camera's capture settings, including storing ambient light properties associated with each captured image concurrently as they are being captured by the camera. The raw images are stored on the headset 505 together with the associated ambient light properties. Once a threshold amount of raw images are stored, the raw images are transferred together with the associated ambient light properties to a smartphone 570. The smartphone 570 performs bulk post-processing on the raw images and associated ambient light properties to generate a hyperlapse video.

Figure 6:
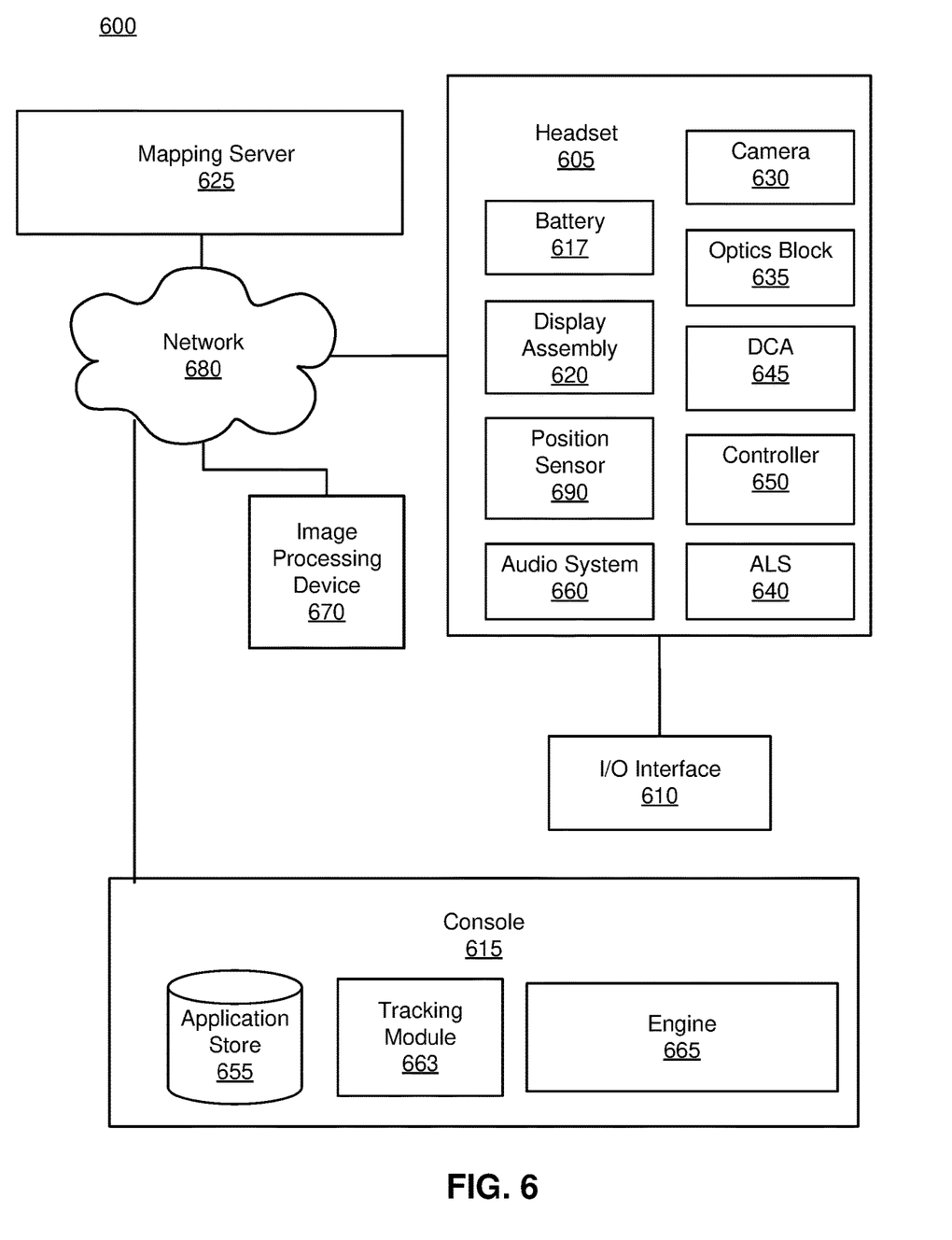
FIG. 6 is a system that includes a headset, in accordance with one or more embodiments.

FIG. 6 is a system 600 that includes a headset 605, in accordance with one or more embodiments. In some embodiments, the headset 605 may be headset 105 of FIG. 1. In embodiments, the headset 605 may be image capture device 205 of FIG. 2. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 680, and the mapping server 625. While FIG. 6 shows an example system 600 including one headset 605 and one I/O interface 610, in other embodiments any number of these components may be included in the system 600. For example, there may be multiple headsets configured as capture devices 605, each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 620, one or more position sensors 690, an audio system 660, an optics block 635, a depth camera assembly (DCA) 645, controller 650, and an ambient light sensor (ALS) 640. Some embodiments of headset 605 may have different components than those described in conjunction with FIG. 6. Additionally, the functionality provided by various components described in conjunction with FIG. 6 may be differently distributed among the components of the headset 605 in other embodiments or may be captured in separate assemblies remote from the headset 605.

The display assembly 620 displays content to the user in accordance with data received from the console 615. The display assembly 620 displays the content using one or more display elements (e.g., the display elements 120 of FIG. 1). A display element may be, e.g., an electronic display. In various embodiments, the display assembly 620 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 of FIG. 1 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 690 is an electronic device that generates data indicating a position of the headset 605. The position sensor 690 generates one or more measurement signals in response to motion of the headset 605. The position sensor 190 of FIG. 1 is an embodiment of the position sensor 690. Examples of a position sensor 690 include: one or more IMUs, one or more accelerometers, one or more gyroscopes, one or more magnetometers, another suitable type of sensor that detects motion, or some combination thereof. The position sensor 690 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605. The DCA 645 generates depth information for a portion of the local area. The DCA includes one or more imaging devices and a DCA controller. The DCA 645 may also include an illuminator. Operation and structure of the DCA 645 is also described above with regard to DCA 145 of FIG. 1.

The audio system 660 provides audio content to a user of the headset 605. The audio system 660 may comprise one or acoustic sensors, one or more transducers, and an audio controller. The audio system 660 may provide spatialized audio content to the user. In some embodiments, the audio system 660 may request acoustic parameters from the mapping server 625 over the network 680. The acoustic parameters describe one or more acoustic properties (e.g., room impulse response, a reverberation time, a reverberation level, etc.) of the local area. The audio system 660 may provide information describing at least a portion of the local area from, for example, the DCA 645, location information for the headset 605 obtained from the position sensor 690, or combinations thereof. The audio system 660 may generate one or more sound filters using one or more of the acoustic parameters received from the mapping server 625 and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system. In one embodiment, the image processing device 670 and console 615 may be the same device and may share some or all features and components.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 690, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 690 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 680 couples the headset 605 and the console 615 to the mapping server 625. The network 680 and network 280 of FIG. 2 may be the same network and may share all or some of the same features, components, and functions. The network 680 may include local area networks, wide area networks, or combinations thereof using wireless communication systems, wired communication systems, or combinations thereof. For example, the network 680 may include the Internet, as well as mobile telephone networks. In one embodiment, the network 680 uses standard communications technologies and/or protocols. Hence, the network 680 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 680 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 680 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 680, information describing at least a portion of the local area, location information for the local area, or combinations thereof. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605. In one embodiment, the image processing device 670 and mapping server 625 may be the same entity and may share some or all features, components, and functions.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Battery 615 of headset 605 powers the other components of headset 605 and their performed functions. In one embodiment, battery 615 may be battery 115 of headset 105. Camera 630 of headset 605 captures images. In embodiments, camera 630 may be camera 130, 230. Ambient light sensor (ALS) 640 of headset 605 detects ambient light properties. ALS 640 may be ALS 140, 240. According to embodiments, the camera 630 of device 605 is configured to capture images in raw format together, and concurrently with, associated ambient light properties detected by the ALS 640, which requires minimal power consumption by battery 615. After a threshold amount pertaining to the number or total size of captured images stored in a data store has been reached, the raw images and associated ambient light properties are transferred to image processing device 670 for bulk image processing to generate a hyperlapse video.

Embodiments described herein provide several technical advantages. By using brightness and color information from the ambient light sensor (which is highly power-efficient) to both inform and drive the controller of an image capture device during capture without triggering the more power-intensive operations of the image signal processer (ISP), images can be captured for the entirety of a long duration hyperlapse. Additionally, by storing captured frames as raw image data that's later processed in bulk, rather than immediately performing image processing and encoding on each frame at the time of capture, the described embodiments enable more advanced and efficient post-processing than was previously available for wearable devices, hand-held devices, and other image capture devices that are low on power and other computing resources. For example, the entire sequence of a hyperlapse capture can be processed all at once during a single post-processing pipeline performed on the captured images and associated ambient light properties. This may further improve battery life of an image capture device by removing the need to continuously trigger an ISP for each captured frame.

Furthermore, by post-processing an entire sequence of images in uncompressed form, less information loss occurs than when processing each frame individually during capture, thereby resulting in higher quality image frames for a hyperlapse video. For example, information (e.g., temporal information) extracted from an entire sequence of captured frames can be leveraged to improve post-processing operations of each individual frame in the sequence and for the image sequence as a whole. Even further, by suspending image processing operations of an image capture device when operating in a low-power scenario, embodiments enable users to continue image capture when using the device in its power-efficient mode, and without sacrificing image quality. In some instances, the solution can be enabled using existing hardware components of consumer electronic wearable devices and hand-held devices, thereby limiting overhead and providing a low-cost solution.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
capturing, with a camera of a device, a sequence of raw images, wherein image processing operations of the camera are suspended while the sequence of raw images is being captured;
detecting ambient light properties for at least some of the raw images in the sequence; and
generating a hyperlapse video by performing bulk image processing operations on the sequence of raw images and the ambient light properties.

2. The method of claim 1, wherein the device is a headset, and wherein a smartphone performs the bulk image processing operations.

3. The method of claim 1, wherein the bulk image processing operations include:
analyzing exposure levels for each of the raw images in the sequence; and
adjusting the exposure level of at least one of the raw images based on the analyzed exposure levels.

4. The method of claim 1, wherein the device includes an ambient light sensor (ALS), and wherein the ambient light properties are detected by the ALS.

5. The method of claim 1, further comprising:
storing the raw images to a data store within the device; and
responsive to a number of the raw images stored in the data store exceeding a threshold amount:
transferring the stored raw images and the ambient light properties to an image processing device.

6. The method of claim 1 further comprising:
bypassing an image signal processing (ISP) pipeline of the camera during the capturing of the raw images; and
concurrent with the capture of the raw images, adjusting one or more of an exposure setting of the camera and a color setting of the camera based on the ambient light properties.

7. The method of claim 1 further comprising:
suspending image processing operations while the device is in a low-power mode; and
responsive to the low-power mode being disabled, performing the bulk image processing operations, wherein completion of the image processing operations generates the hyperlapse video.

8. The method of claim 1 further comprising:
storing the captured images and the ambient light properties on a data store within the device.

9. The method of claim 8, wherein the bulk image processing operations are performed after a threshold amount of the captured images are stored on the data store.

10. A device comprising:
a camera configured to capture images;
a sensor configured to detect associated ambient light properties for at least some of the captured images; and
a data store, wherein after a threshold amount of captured images are stored to the data store, the stored captured images and the associated ambient light properties are processed in bulk to generate a hyperlapse video.

11. The device of claim 10, wherein the device is a headset, and wherein a smartphone processes, in bulk, the stored captured images and the associated ambient light properties to generate the hyperlapse video.

12. The device of claim 10, wherein the processing in bulk, the stored captured images and the associated ambient light properties to generate the hyperlapse video includes:
    analyzing exposure levels for each of the captured images; and
    adjusting the exposure level of at least one of the captured images based on the analyzed exposure levels.

13. The device of claim 10, wherein the sensor includes an ambient light sensor (ALS).

14. The device of claim 10, wherein the camera is further configured to bypassing an image signal processing (ISP) pipeline of the camera during the capture of the images,
    and wherein concurrent with the capture of the images, one or more of an exposure setting of the camera and a color setting of the camera are adjusted based on the associated ambient light properties detected by the sensor.

15. The device of claim 10 further comprising:
    suspending image processing operations while the device is in a low-power mode; and
    responsive to the low-power mode being disabled, performing the processing, in bulk, of the captured images and the associated ambient light properties to generate the hyperlapse video.

16. The device of claim 10, wherein at least one image captured is a high dynamic range (HDR) frame.

17. The device of claim 10, wherein the device is a headset.

18. A method comprising:
    suspending, by an image processing device, image processing operations while in a low-power mode;
    capturing a sequence of images while in the low-power mode;
    detecting ambient light properties for at least some of the images; and
    responsive to the low-power mode being disabled, performing bulk image processing operations by the image processing device using the sequence of images and the ambient light properties.

19. The method of claim 18, wherein completion of the bulk image processing operations generates a hyperlapse video.

20. The method of claim 18, further comprising:
    detecting, via a position sensor, associated gyroscope data relating to at least some of the images; and
    wherein the bulk image processing operations include:
        generating a plurality of image frames using the sequence of images;
        adjusting one or more of a rotation, orientation, or position of at least one of the image frames based on the gyroscope data; and
        generating a video using the plurality of image frames, including the at least one adjusted image frame.

\* \* \* \* \*